United States Patent [19]

Sugawara

[11] Patent Number: 5,684,906
[45] Date of Patent: Nov. 4, 1997

[54] FIBER OPTICAL PLATE

[75] Inventor: Takeo Sugawara, Hamamatsu, Japan

[73] Assignee: Hamamatsu Photonics K.K., Hamamatsu, Japan

[21] Appl. No.: 686,680

[22] Filed: Jul. 26, 1996

[30]   Foreign Application Priority Data

Jul. 26, 1995 [JP] Japan .................. 7-190509

[51] Int. Cl.$^6$ ........................ G02B 6/04
[52] U.S. Cl. ............ 385/120; 385/121; 385/901
[58] Field of Search .................. 385/115–121, 901

[56]       References Cited

U.S. PATENT DOCUMENTS

| | | | |
|---|---|---|---|
| 3,402,000 | 9/1968 | Crawford | 350/96 |
| 3,874,783 | 4/1975 | Cole | 385/115 |
| 3,906,520 | 9/1975 | Philips | 354/62 |
| 4,932,776 | 6/1990 | Dowiing, Jr. et al. | 356/71 |
| 5,381,502 | 1/1995 | Veligdan | 385/115 |
| 5,426,296 | 6/1995 | Shikai et al. | 250/227.2 |

FOREIGN PATENT DOCUMENTS 7-174947   7/1995   Japan .

*Primary Examiner*—John Ngo
*Attorney, Agent, or Firm*—Cushman Darby & Cushman IP Group of Pillsbury Madison & Sutro, LLP

[57]           ABSTRACT

When a fiber optical plate is applied to a touch sensor, a flat touch surface can be formed, and the overall device using the fiber optical plate can be formed into a low-profile structure. The numerical aperture of the input end face of one slant FOP is set to be larger than that of the output end face of another slant FOP to cause light incident from the latter slant FOP to be efficiently incident on the former slant FOP. The detection surface and the output end face are located to be orthogonal to each other. With this structure, the detection surface can be formed evenly with the touch surface. In addition, detection elements such as a CCD can be disposed at the output end face along the lower surface of the touch surface.

3 Claims, 8 Drawing Sheets

FIBER OPTICAL PLATE

BACKGROUND OF THE INVENTION

1. Field of the Invention

The present invention relates to a fiber optical plate formed by integrally bundling a plurality of optical fibers.

2. Related Background Art

A fiber optical plate (to be referred to as an FOP hereinafter) like the one shown in FIG. 1 has been known (U.S. Pat. No. 4,932,776). An FOP 80 is formed by integrally bundling a large number of optical fibers 85. An input end face 81 is cut on one end of the FOP 80 to have a slope with respect to the optical axis. When a finger 82 of a user is brought into tight contact with the input end face 81, the uneven pattern of the contact portion appears on an output end face 83 on the opposite side to the input end face 81. As a result, an image of a fingerprint 84 can be read.

Assume that such an FOP is applied to a touch sensor. In this case, if the input end face 81 is set to be flush with a touch surface 86, the output end face 83 protrudes to the lower left side in FIG. 2, as shown in FIG. 2. In addition, since a detection element such as a CCD is mounted on the output end face 83, the thickness of this sensor unit increases, posing a problem in realizing a low-profile sensor unit. In order to realize a low-profile structure, the FOP 80 may be cut to be short along the optical axis. In this case, however, a recess 87 is formed in the surface of the touch surface 86, and hence a flat touch surface cannot be obtained.

SUMMARY OF THE INVENTION

It is an object of the present invention to provide an FOP which can be used to form a touch sensor having a flat touch surface, and can realize a low-profile device as a whole.

A fiber optical plate according to the present invention is formed by joining first to third optical plates to each other.

The first optical plate has a major input end face inclined with respect to the optical axis of each optical fiber constituting the plate. The slant angle of the major input end face with respect to the optical axis of each object fiber is set to prevent total reflection of light incident from air into a core from occurring on the interface between the core and the cladding. By setting the slant angle in accordance with this condition, light that has propagated in air and become incident from the major input end face into the core gradually attenuates in the process of propagation in the core. The second plate is joined to the output end face of the first optical plate and transmits light incident from the first optical plate. The third optical plate is joined to the output end face of the second optical plate, and has a major output end face from which an input image from the major input end face is output. In addition, the numerical aperture of the input end face of the second optical plate is set to be larger than that of the output end face of the first optical plate to cause light emerging from the first optical plate to be efficiently incident on the second optical plate.

In a fiber optical plate according to another aspect of the present invention, a major input end face and a major output end face are located to be almost orthogonal to each other to allow the major input end face to be even with a predetermined setting surface. In addition, detection elements and the like can be disposed at the major output end face along the lower surface of the setting surface.

In a fiber optical plate according to still another aspect of the present invention, a third optical plate is tapered such that its plate diameter gradually decreases toward the major output end face side. With this structure, an output image is reduced to allow a reduction in the size of a detection element or the like. In addition, with an increase in reduction ratio, an image must be incident on the input end face of the third optical plate as perpendicularlly as possible. That is, light emerging from a second optical plate is preferably incident on the third optical plate while the fiber axis of the third optical plate coincides with that of the second optical plate as accurately as possible. For this reason, the joint surface between the second and third optical plates is formed to be almost perpendicular to the main fiber axis of the third optical plate. Note that the main fiber axis is the optical axis of an optical fiber located in almost the center of the third optical plate.

In a fiber optical plate according to still another aspect of the present invention, in addition to fourth, sixth, and seventh optical plates corresponding to the first, second, and third optical plates, a fifth optical plate having light absorbers for optically insulating bundled optical fibers from each other is joined between the fourth and sixth optical plates. The numerical aperture of the input end face of the sixth optical plate is set to be larger than that of the output end face of the fifth optical plate to cause light emerging from the fifth optical plate to be efficiently incident on the sixth optical plate. In addition, of the light emerging from the fourth optical plate, so-called stray light incident as noise on the sixth optical plate is removed by the light absorbers of the fifth optical plate.

Note that each light absorber is made of a glass material containing a large amount of an oxide coloring material such as $Ni_2O_3$, $Co_2O_3$, $Cr_2O_3$, $CuO$, or $Fe_2O_3$ to effectively absorb/remove stray light.

In a fiber optical plate according to still another aspect of the present invention, a major input end face and a major output end face are located to be almost orthogonal to each other. With this structure, the major input end face can be flush with a predetermined setting surface. In addition, detection elements and the like at the major output end face can be disposed along the lower surface of the setting surface.

In a fiber optical plate according to still another aspect of the present invention, a seventh optical plate is tapered such that its plate diameter gradually decreases toward the major output end face. In addition, the joint surface between a sixth optical plate and the seventh optical plate is located to be almost perpendicular to the main fiber axis of the seventh optical plate.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

<First Embodiment>

Embodiments of the present invention will be described below with reference to the accompanying drawings.

Figure 4:
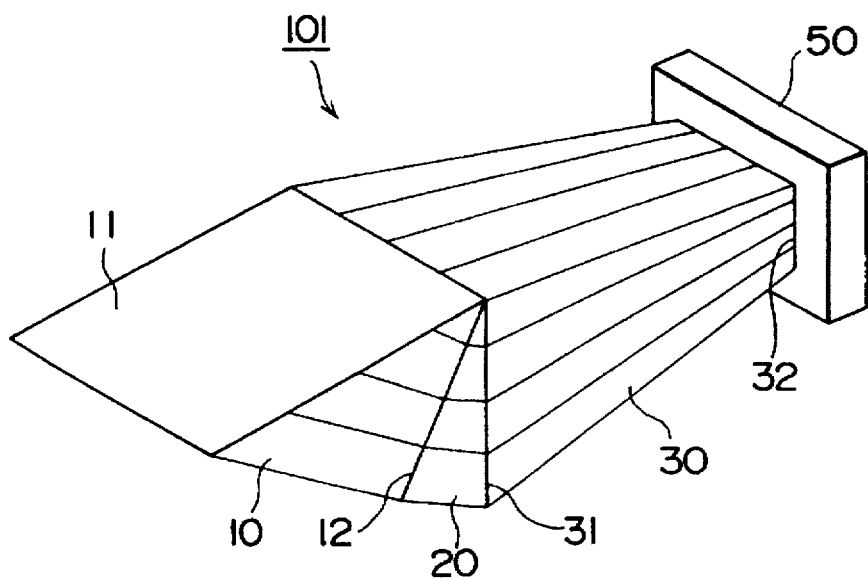
FIG. 4 is a perspective view showing a fiber optical plate according to the first embodiment of the present invention.
Figure 5:
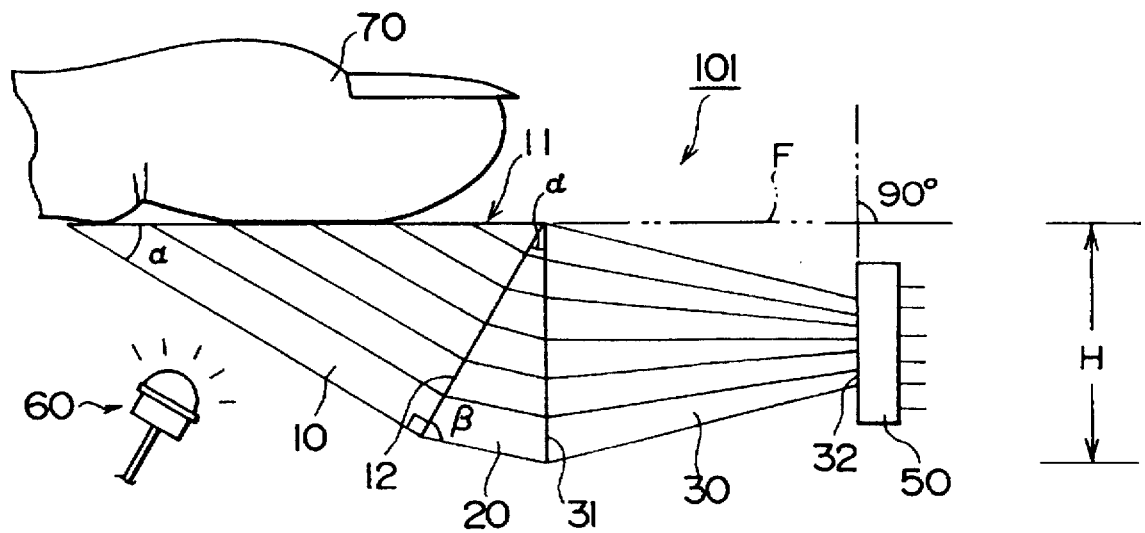
FIG. 5 is a side view of the fiber optical plate in FIG. 4.

FIGS. 4 and 5 show the outer appearance of a fiber optical plate (to be referred to as an FOP hereinafter) 101. This FOP 101 is formed by serially bonding slant FOPs 10 and 20 and a tapered FOP 30, each consisting of an optical plate. A CCD 50 is fixed on an output end face (major output end face) 32 of the tapered FOP 30. Note that each FOP consists of an optical plate formed by integrally bundling optical fibers each consisting of a core and a cladding. For the sake of convenience, the directions of the fibers in each FOP are indicated by solid lines on a side surface of each FOP.

A detection surface 11 of the slant FOP 10 is cut at an angle (slant angle) $\alpha$ with respect to the optical axis of each optical fiber. An exit surface 12 of the slant FOP 10 is cut to be perpendicular to the optical axis of each optical fiber. The slant FOP 10 has the shape of a triangular prism as a whole. The slant angle $\alpha$ of the detection surface 11 will be described in detail later.

The slant FOP 20 is joined to the exit surface 12 of the slant FOP 10 to transmit incident light from the slant FOP 10 via a bundle of optical fibers. Note that the slant FOP 20 is cut such that the optical axis of the bundle of optical fibers has a gentler slope than the optical axis of the bundle of optical fibers of the slant FOP 10. The slant FOPs 10 and 20 are made of optical materials having predetermined refractive indexes such that the numerical aperture (N.A.) of the input end face of the slant FOP 20 becomes larger than that of the exit surface 12 of the slant FOP 10. This will also be described in detail later.

The tapered FOP 30 is tapered such that its diameter gradually decreases from an input end face 31 to the output end face 32. The input end face 31 is jointed to the output end face of the slant FOP 20. With this structure, an image incident from the slant FOP 20 is reduced in the process of propagation in the tapered FOP 30. This reduced image can be obtained from the output end face 32. Note that the joint surface between the output end face of the slant FOP 20 and the input end face of the tapered FOP 30 is perpendicular to the axis of a fiber located in the center of the tapered FOP 30.

A light source 60 for illumination is disposed below the detection surface 11. At this position, the light source 60 irradiates illumination light onto a fingertip 70 or the like as an object which is pressed against the detection surface 11. The irradiated illumination light is transmitted through the slant FOP 10 to reach the detection surface 11. The light is then reflected, transmitted, and scattered by the uneven pattern (fingerprint) of the fingertip 70 pressed against the detection surface 11. As a result, a corresponding density pattern is formed. Of the above light, only the reflected light propagates in the slant FOP 10, the slant FOP 20, and the tapered FOP 30, repeating total reflection in the optical fibers. As a result, the reflected light appears as a density pattern (output image) on the output end face 32.

The slant angle $\alpha$ of the detection surface 11 of the slant FOP 10 will be described below.

Figure 6:
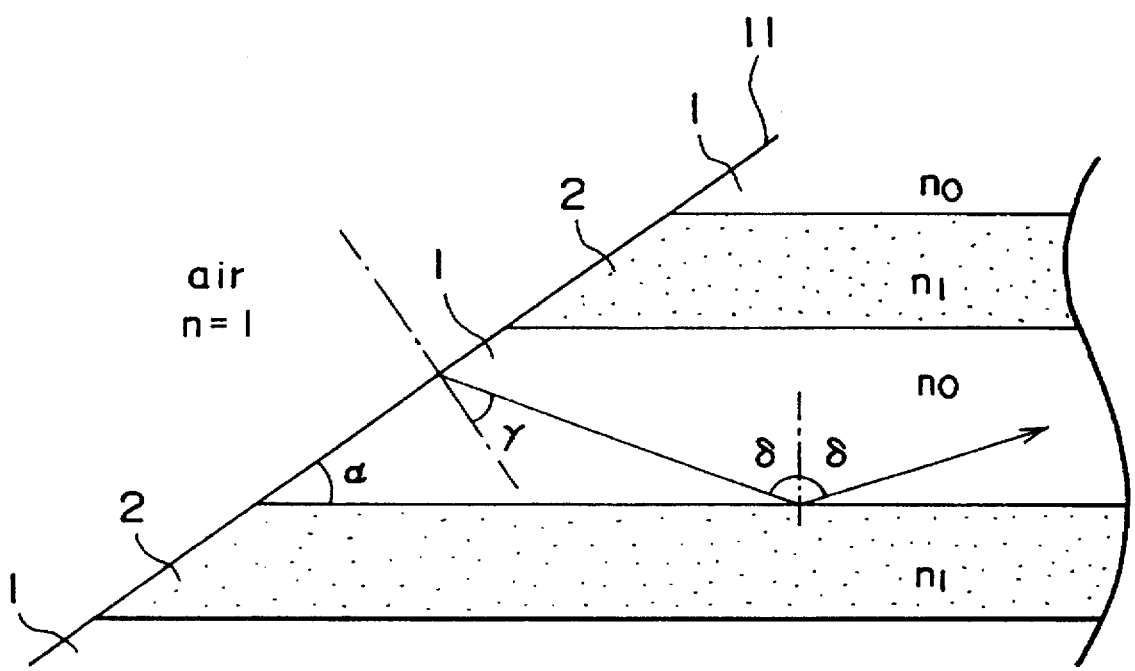
FIG. 6 is a partial enlarged sectional view of a side surface of a slant FOP 10.

FIG. 6 is a sectional view of the slant FOP 10. Referring to FIG. 6, reference symbol $n_0$ denotes the refractive index of a core; $n_1$, the refractive index of a cladding; and n, the refractive index of air. The slant angle $\alpha$ of the detection surface 11 of the slant FOP 10 is defined to have a light-receiving angle of 0°. That is, the slant angle $\alpha$ is set to prevent total reflection on the interface between a core 1 and a cladding 2 regardless of the angle at which light is incident from air onto the core 1.

This slant angle $\alpha$ is defined by the following equations:

$$n_0 \sin\delta = n_1 \sin 90° \quad \text{(condition for total reflection)} \quad (1)$$

$$n_0 \sin\gamma = n \sin 90° \quad \text{(condition for light-receiving angle of 0°)} \quad (2)$$

$$\alpha + (90° + \gamma) + (90° - \delta) = 180° \quad (3)$$

In this case, if $n_0 = 1.621$, $n_1 = 1.519$, and $n = 1$, then $\alpha = 31.54°$. If, therefore, the slant angle $\alpha$ is equal to or less than this value, no total reflection is caused on the interface between the core 1 and the cladding 2 regardless of the angle at which light propagating in air is incident from the detection surface 11.

Light that enters the detection surface 11 and propagates in the slant FOP 10 therefore gradually attenuates in the process of repetitive refraction, and is hardly output from the output end face 32.

Figure 7:
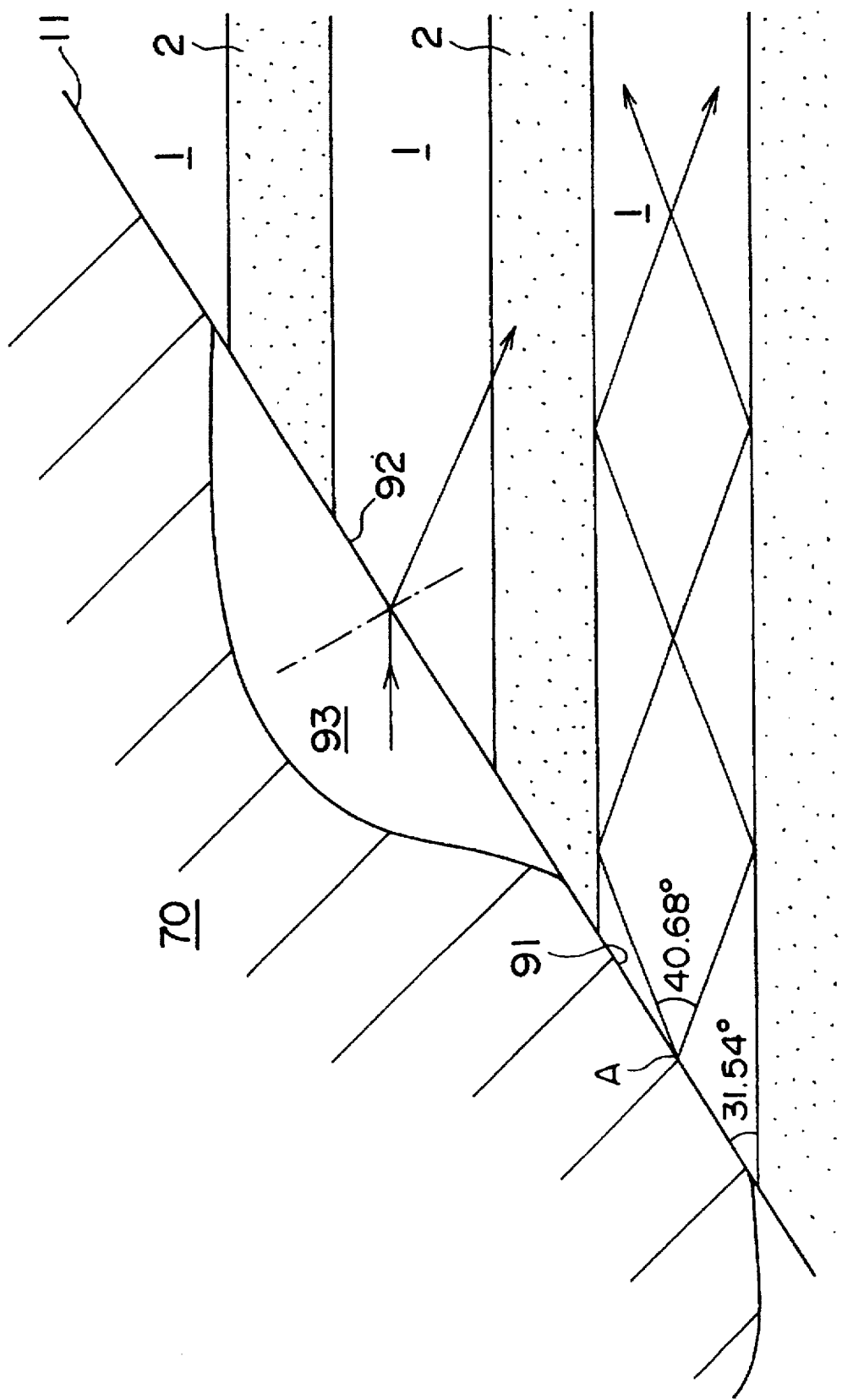
FIG. 7 is a sectional view for explaining how light propagates while a fingertip of a user is in tight contact with a detection surface.

As shown in FIG. 7, when the surface of the fingertip 70 as an object to be detected is brought into tight contact with the detection surface 11, a contact portion 91, which is in tight contact with the detection surface 11, and a noncontact portion 92, which defines a gap together with the detection surface 11, are formed owing to the uneven pattern of the finger print. At the contact portion 91, the detection surface 11 and the surface of the fingertip 70 are in tight contact with each other, and the refractive index of the surface of the finger is larger than that of air. For this reason, the relationship between the incident angle of light incident on the detection surface 11 and the condition for total reflection on the interface between the core 1 and the cladding 2 changes after the fingertip 70 is brought into tight contact with the detection surface 11, so that some light components are incident at angles that meet the condition for total reflection. Assume that illumination light from the light source 60 is transmitted through the slant FOP 10 and reaches a point A. At this point A, the illumination light is transmitted/absorbed and scattered to disappear. However, only part of the light is reflected and incident on the slant FOP 10 to propagate therein. Of the incident light, only light components reflected within the range of 40.68° meet the condition for total reflection on the interface between the core 1 and the cladding 2 (according to equation (2)), as shown in FIG. 7. These light components are output from the exit surface 12 upon repetitive total reflection on the interface between the core 1 and the cladding 2. Note that light components which are incident outside this angle range attenuate in the process of repetitive refraction and propagation.

In contrast to this, at the noncontact portion 92, a gap portion 93 is formed, as shown in FIG. 7, in which air exists. That is, no change occurs before and after the fingertip 70 is brought into tight contact with the detection surface 11. Although background light is incident on the noncontact portion 92 of the detection surface 11 and propagates in the core 1, since the light does not meet the condition for total reflection on the interface between the core 1 and the cladding 2, the light attenuates to disappear in the process of propagation in the core 1 regardless of the angle at which the light is incident.

As described above, therefore, when an object is brought into tight contact with the detection surface 11, illumination light from the light source 60 which is transmitted through the slant FOP 10 to reach the object is transmitted/absorbed into the object in tight contact with the detection surface 11 from a projection on the surface of the object to be scattered and disappear. However, only part of the light is incident and propagates into a fiber of the slant FOP 10 from the projection on the surface of the object. This light propagates while repeating total reflection. At a recess in the surface of the object, illumination light having reached the detection surface 11 is reflected thereby as in the case of the projection. The reflected light propagates in the fiber within the angle range (40.68°) shown in FIG. 7 upon repetitive total reflection. The light incident from the recess in the surface of the object attenuates to disappear in the process of propagation. For this reason, unnecessary light such as background light is removed, and a density pattern image based on the intensity differences between the portions which are in tight contact with the detection surface 11 and portions which are not in contact with the detection surface 11 propagates to be output.

In the above case, N.A. (numerical aperture) is set to 0.55. Table 1 shows slant angles α with respect to typical values of N.A.

TABLE 1

| N.A | Slant Angle (α) |
|---|---|
| 0.35 | 36.96° |
| 0.55 | 31.54° |
| 0.88 | 25.20° |
| 1.00 | 21.89° |

As described above, with slant FOPs which have defined slant angle α of the detection surface 11, no light, such as background light propagating in each fiber upon repetitive total reflection, is output from the output end face 32 of the tapered FOP 30 as the last stage while a fingertip of the user or the like is not in contact with the detection surface 11. When a fingertip is brought into contact with the detection surface 11, an image of the fingerprint is output from the output end face 32. Such a fiber optical plate can be used as the sensor unit of a fingerprint reader. In addition, since a light signal is output from the output end face 32 only when a fingertip of the user or the like is brought into contact with the detection surface 11, this fiber optical plate can be used as a general touch sensor.

The relationship between the numerical aperture (to be referred to as the N.A. hereinafter) of the input end face of the slant FOP 20 and the N.A. of the exit surface 12 of the slant FOP 10 will be described next.

Since the optical axis of each fiber of the slant FOP 10 does not coincide with that of the slant FOP 20, part of light which is incident from the slant FOP 10 to propagate in the slant FOP 20 may emerge from the fiber. In such a case, the amount of signal light to be transmitted decreases. For this reason, the N.A. of the input end face of the slant FOP 20 is set to be larger than that of the exit surface 12 of the slant FOP 10.

Figure 8:
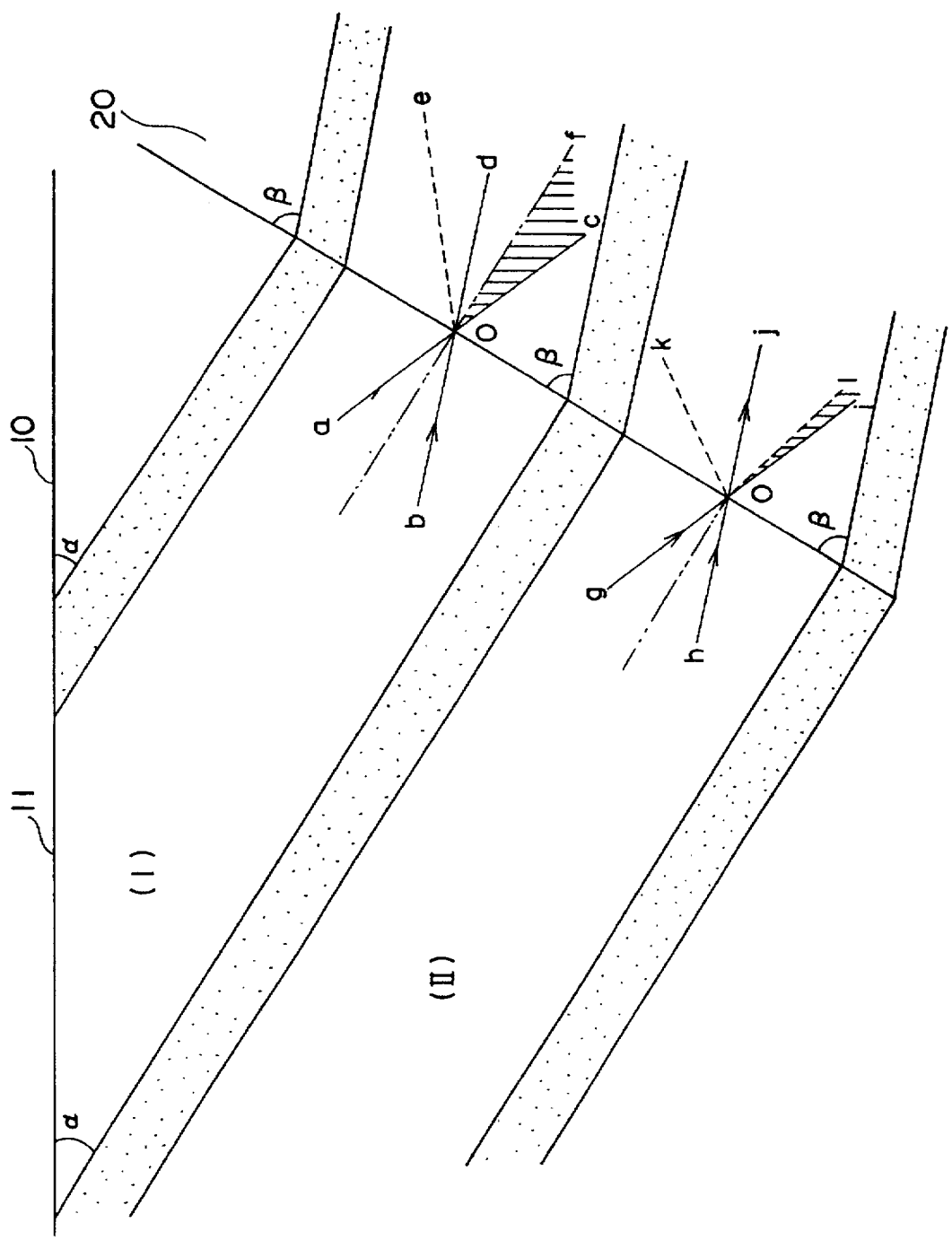
FIG. 8 is a longitudinal sectional view schematically showing a joint portion between the slant FOP 10 and an absorption FOP 20.

The reason for this setting will be described with reference to FIG. 8. Referring to FIG. 8, "(I)" indicates a case wherein the N.A. of the slant FOP 10 is equal to that of the slant FOP 20, and "(II)" indicates a case wherein the N.A. of the slant FOP 20 is larger than that of the slant FOP 10.

In case "I", light incident on the slant FOP 20 side within the range of (angle) aob emerges within the range of (angle) cod. In order to make light propagate in each optical fiber of the slant FOP 20 upon total reflection, the light must emerge within the range of (angle) eof. That is, light which propagates in the slant FOP 20 upon total reflection is light emerging within the range of (angle) dof. Light which emerges within the range of (angle) foc emerges from the fiber. Accordingly, the amount of light propagating in the fiber decreases. Similarly, in case "II", of the light which is incident on the slant FOP 20 within the range of (angle) goh, light components which propagate in the slant FOP 20 upon total reflection are light components which emerge within the range of (angle) jol. Light components which emerge within the range of (angle) loi emerge from the fiber. Accordingly, the amount of light propagating in the fiber decreases. When cases "I" and "II" are compared with each other, it is found that the loss of the amount of light propagating in the fiber in case "II" is smaller.

A case wherein the N.A. of the slant FOP 20 is 0.55 (corresponding to "I") and a case wherein the N.A. of the slant FOP 20 is 1.0 (corresponding to "II") are actually compared with each other as follows, with the N.A. of the slant FOP 10 being set to 0.55. Note that α=31.54°, and β=70°. In case "I", (angle) aob=(angle) cod=(angle) eof=40.68°
(angle) fod=40.68°−(90°−70°)=20.68°
(angle) cof=20°

In case "II", (angle) goh=40.68°
(angle) ioj=36.07°
(angle) jol=3.04°

When the loss ratio of the amount of light in case "I" is compared with that in case "II", (I)=(angle) cof/(angle)cod=20/40.68≈0.492
(II)=(angle) jol/(angle) ioj=3.04/36.07≈0.084

The loss amount in case "II" decreases to about 17% that in case (I).

In case "II", therefore, the amount of signal light incident into each optical fiber of the tapered FOP 30 increases, and hence a clearer pattern image can be detected by the CCD 50, as compared with case "I".

Effects obtained by joining the slant FOP 20 having a fiber axis whose slant angle is gentler than that of the slant FOP 10, to the front surface of the tapered FOP 30 will be described below. If the reduction ratio of the N.A. of the tapered FOP 30 is r:1, then N.A. (L)=(1/r)×N.A. (S)

where N.A. (L) is the numerical aperture of the input end face 31 of the tapered FOP 30, and N.A. (S) is the numerical aperture of the output end face 32.

If, for example, the reduction ratio is 5:1 with N.A. (S)=1.0, the N.A. (L) becomes 0.2, and the light-receiving angle becomes 11.5°, which is very small. In other words, when the reduction ratio is large as in this case, an image must be incident on the input end face of the tapered FOP 30 as perpendicularlly as possible. For this reason, as in this embodiment, the slant FOP 20 whose fiber axis has a gentle slant angle is joined to the rear surface of the slant FOP 10 whose fiber axis has a steep slant angle. With this structure, an image can be incident on the input end face 31 of the tapered FOP 30 at an angle closer to normal incidence. This structure is especially effective when the reduction ratio of the tapered FOP 30 is large.

Figure 1:
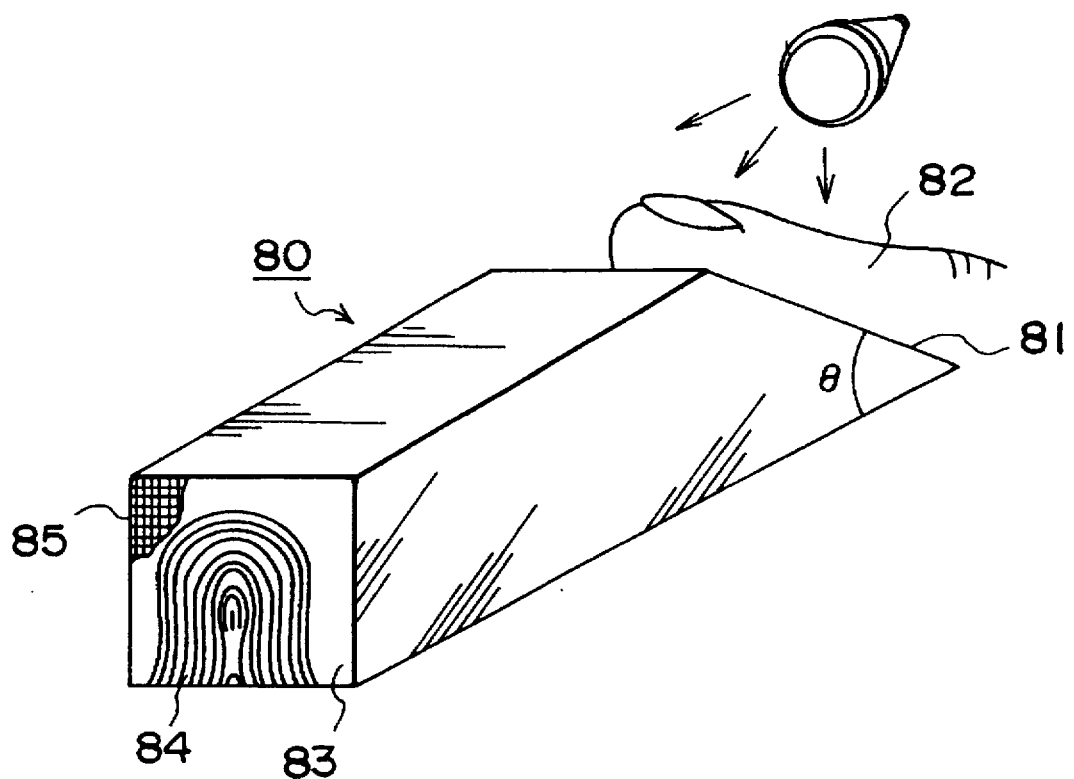
FIG. 1 is a perspective view showing a conventional fiber optical plate.
Figure 2:
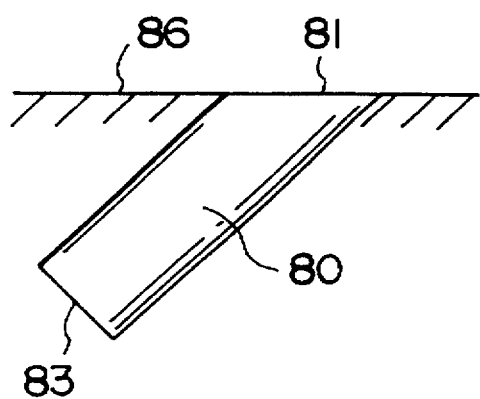
FIGS. 2 and 3 are sectional views for explaining how conventional fiber optical plates are arranged.
Figure 3:
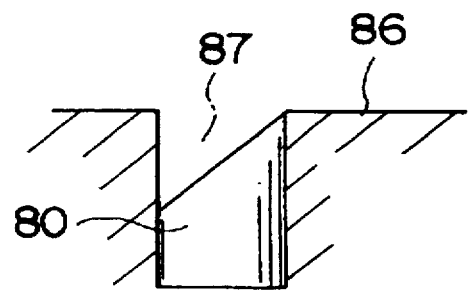

In the FOP 101 having such a structure, the output end face 32 of the tapered FOP 30 is perpendicular to the detection surface 11. Therefore, when the FOP 101 is applied to a touch sensor or the like, since the detection surface 11 is located at the same plane position as that of a touch surface F, the touch surface F can be formed flat (see FIG. 2). In addition, since the CCD 50 and other elements can be disposed behind the output end face 32 along the touch surface F, the overall device including the light source 60 can be assembled within a thickness H in FIG. 5. Such a device can be incorporated in a low-profile apparatus.

<Second Embodiment>

Figure 9:
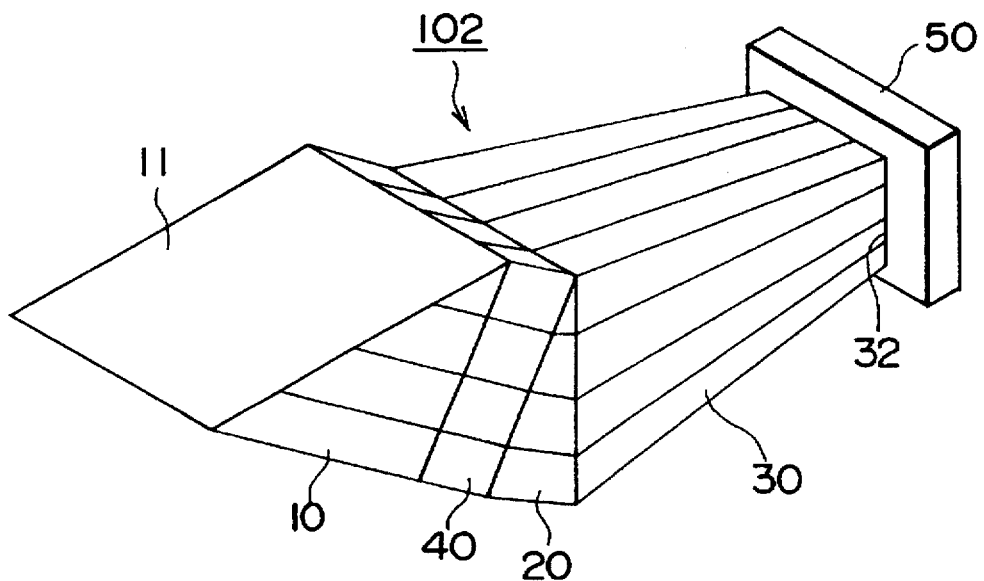
FIG. 9 is a perspective view showing a fiber optical plate according to the second embodiment of the present invention.
Figure 10:
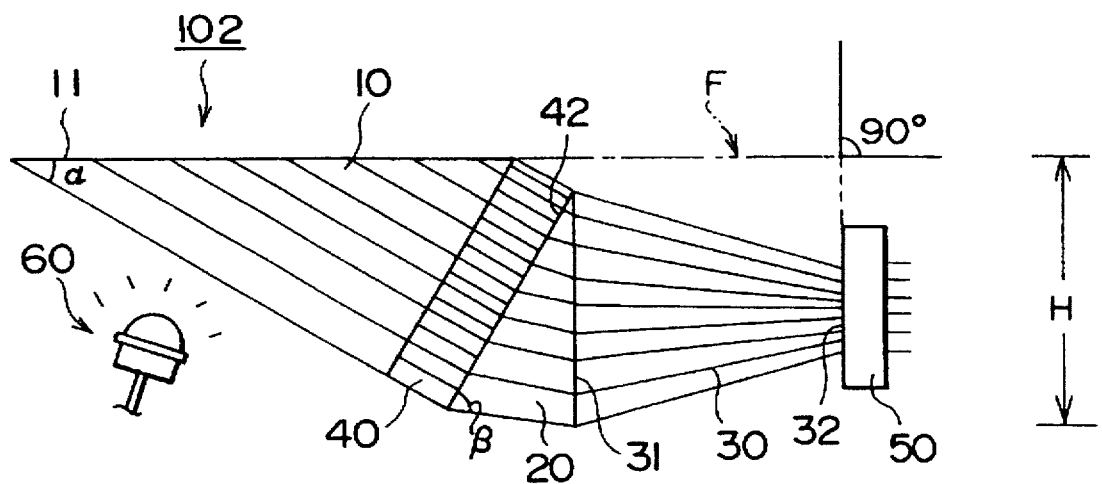
FIG. 10 is a side view of the fiber optical plate in FIG. 9.

FIGS. 9 and 10 show another embodiment of the present invention. An FOP 102 is formed by joining an absorption FOP 40 between the slant FOPs 10 and 20 of the FOP 101 described above. Other arrangements of the FOP 102 are the same as those of the FOP 101, and a description thereof will be omitted.

Figure 11:
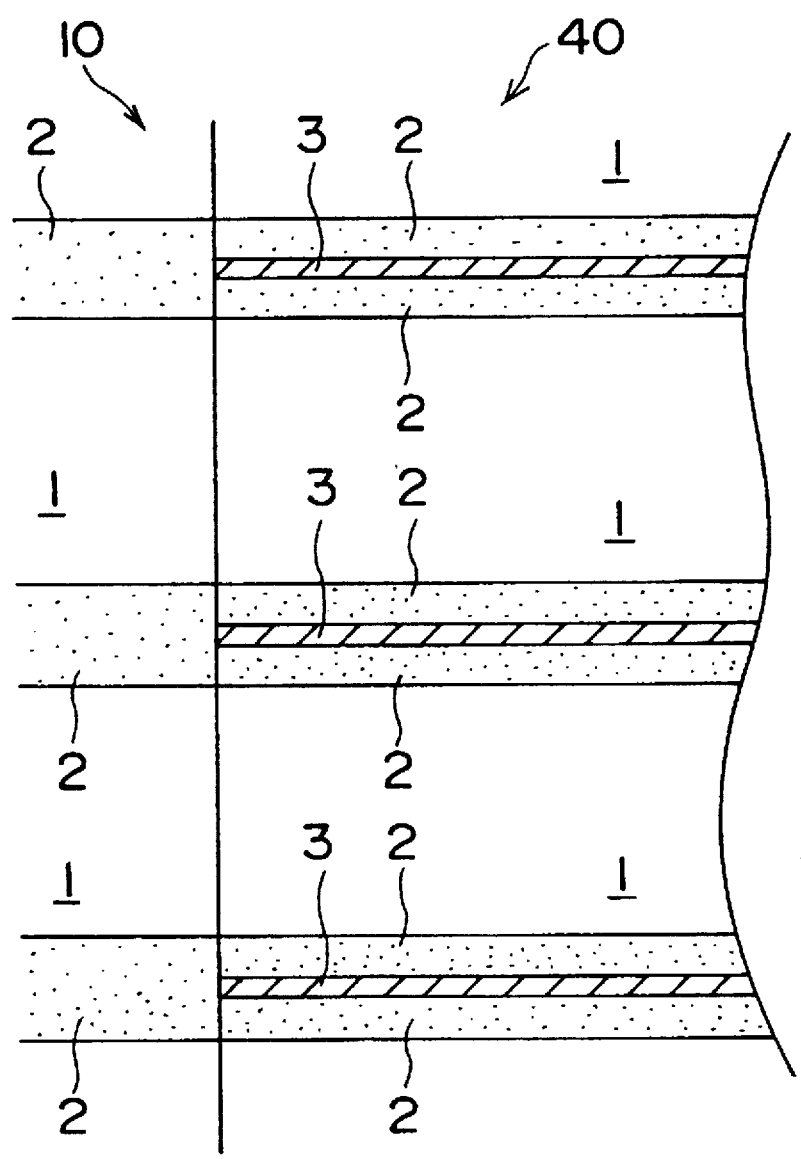
FIG. 11 is a longitudinal sectional view schematically showing a joint portion between a slant FOP 10 and an absorption FOP 40.
Figure 12:
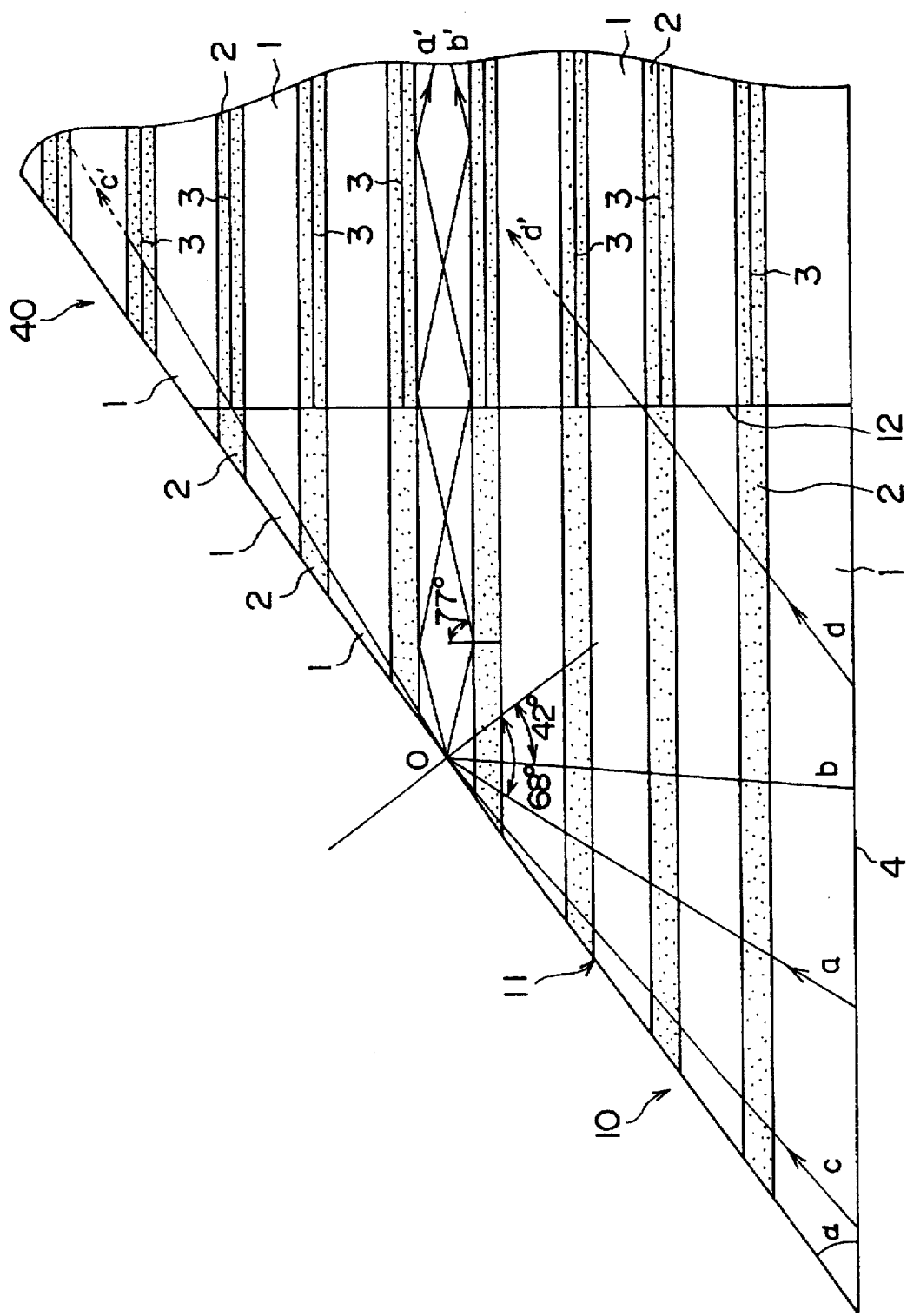
FIG. 12 is a sectional view for explaining how light propagates in the slant FOP 10 and the absorption FOP 40.

In the absorption FOP 40, a light absorber 3 covers each cladding 2 (FIGS. 11 and 12). The bundled optical fibers are optically insulated from each other by the light absorbers 3. The fiber axis of the absorption FOP 40 coincides with that of a slant FOP 10. The N.A. of the input end face of the absorption FOP 40 is set to be equal to or less than that of the output end face of the slant FOP 10.

As in the first embodiment, the numerical aperture (N.A.) of the input end face of a slant FOP 20 is set to be larger than that of an output end face 42 of the absorption FOP 40 so as to reduce the amount of signal light that leaks from this portion.

FIG. 12 is a sectional view of a joint portion between the slant FOP 10 and the absorption FOP 40. Assume that the refractive indexes of the slant FOP 10 and the absorption FOP 40 are 1.56 and 1.52, respectively, and a slant angle α of a detection surface 11 of the slant FOP 10 is 35°. In this case as well, the slant angle α of the detection surface 11 is set to prevent total reflection on the interface between a core 1 and the cladding 2 regardless of the angle at which light propagating in air is incident from the detection surface 11.

The condition for total reflection in an optical fiber in each FOP is given by:

1.56·sin θ=1.52·sin 90°

In this case, θ is approximately 77° (=critical angle). That is, no total reflection occurs unless light is incident on the cladding 2 at an angle equal to or larger than 77°. Light which is incident at an angle smaller than 77° is therefore refracted at the interface between the core 1 and the cladding 2 and escapes from the fiber.

Light which is incident from a light source 60 disposed below a lower surface 4 of the slant FOP 10 meets the condition for total reflection, when the illumination light is incident on the detection surface 11 at an angle of 42° to 68°.

Referring to FIG. 12, lines a - a' and b - b' respectively indicate the propagation routes of light beams a and b which correspond to the upper and lower limits of the above incident angles. A light beam c which is incident at an angle larger than the incident angle of the light beam a is reflected by the detection surface 11 and enters the cladding 2. Since the angle at which this light beam is incident on the interface is larger than the critical angle, 77°, no total reflection occurs on the interface between the core 1 and the cladding 2, and the light beam continues to be repeatedly refracted and travel (line c - c'). Illumination light directly emerging toward the absorption FOP 40 travels like a light beam d (line d - d'). Stray light beams represented by the light beams c and d propagate on such routes and become incident on the absorption FOP 40. In this case, as shown in FIG. 12, the light beams are incident on the light absorber 3 to be absorbed and disappear. As described above, stray light beams propagating in the slant FOP 10 are incident on the absorption FOP 40 to be absorbed and disappear. For this reason, no such stray light beams are incident on the slant FOP 20 behind the slant FOP 10. As a result, an image from which unnecessary light components are removed is incident on a CCD 50 disposed on an output end face 32. Therefore, an image having an increased S/N ratio is detected in the FOP 102, as compared with the FOP 101.

Similar to the FOP 101 described above, the slant FOP 20 whose fiber axis has a gentle slant angle is arranged behind the slant FOP 10 whose fiber axis has a large slant angle and the absorption FOP 40. With this structure, an image can be incident on the input end face 31 of the tapered FOP 30 at an angle closer to normal incidence. This structure is especially effective when the reduction ration of the tapered FOP 30 is large.

In the FOP 102 having the above structure, the output end face of the tapered FOP 30 is perpendicular to the detection surface 11. Therefore, when the FOP 102 is applied to a touch sensor or the like, since the detection surface 11 is flush with a touch surface F, the touch surface F can be formed flat (see FIG. 2). In addition, since the CCD 50 and other elements can be disposed behind the output end face 32 along the touch surface F, the overall device including a light source 60 can be assembled within a thickness H in FIG. 10. Such a device can be incorporated in a low-profile apparatus.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.190509/1995 filed on Jul. 26, 1995 is hereby incorporated by reference.

What is claimed is:

1. A fiber optical plate formed by joining first, second and third optical plates to each other, each optical plate being formed by bundling a plurality of optical fibers each having a core and a cladding, comprising:

a first optical plate having a major input end face which is inclined with respect to an optical axis of the optical fiber such that a slant angle of the major input end face with respect to the optical axis of the optical fiber is set to prevent total reflection of light incident from air into the core from occurring on an interface between the core and the cladding;

a second optical plate joined to an output end face of said first optical plate and transmitting light incident from said first optical plate; and a third optical plate joined to an output end face of said second optical plate and having a major output end face from which an input image from the major input end face is output, wherein a numerical aperture of an input end face of said second optical plate is set to be larger than a numerical aperture of an output end face of said first optical plate.

2. A plate according to claim 1, wherein the major input end face and the major output end face are substantially perpendicular to each other.

3. A plate according to claim 1, wherein said third optical plate is tapered such that a plate diameter gradually decreases toward the major output end face, and a joint surface between said second and third optical plates is substantially perpendicular to a main fiber axis of said third optical plate.

* * * * *